June 28, 1949. J. A. BORDEN Re. 23,129

TAPE DISPENSER

Original Filed July 31, 1936

Inventor:
John A. Borden:
By: Paul Carpenter
Atty.

Reissued June 28, 1949 Re. 23,129

UNITED STATES PATENT OFFICE 23,129

TAPE DISPENSER

John A. Borden, St. Paul, Minn., assignor to Minnesota Mining & Manufacturing Company, St. Paul, Minn., a corporation of Delaware Original No. 2,221,213, dated November 12, 1940, Serial No. 93,661, July 31, 1936. Application for reissue February 3, 1949, Serial No. 74,281 Renewed September 9, 1939

5 Claims. (Cl. 164—84.5)

This invention relates broadly to a device for sustaining and dispensing rolls of ribbon-like material and more particularly to a device for retaining and dispensing rolls of adhesive tape of a nature such that temporary adhesion between successive layers of the tape in the roll will normally prevent the tape from unrolling except when removed from the roll by the user.

This invention finds particular utility for holding and dispensing pressure sensitive adhesive tape, such, for example, as the ordinary surgeon's tape and such tapes as are disclosed in United States Patent No. 1,760,820 to Richard G. Drew and other tapes wherein the adhesive coating is of a normally tacky and/or pressure sensitive nature.

Dispensers for such adhesive tapes, previously known to me have been objectionable from the standpoint of practical use in that they have not supplied a means for retaining the end of the tape which is removed from the roll in such a manner as to prevent an accidental reversal of the movement of the roll which would withdraw the loose end from the outlet and necessitate rethreading of the tape through the dispenser outlet upon the next occasion for removing a section of the tape. Furthermore, the dispensers previously known to me have been objectionable in that the dispenser outlet has usually consisted of a closed passageway through which the tape must be threaded. Another objection to dispensers previously known to me lies in the fact that the end of the tape is not readily accessible to be grasped by the use for withdrawal. Still further objections to dispensers previously known to me reside in the fact that when such dispensers are placed upon a desk or support it has been necessary to fasten the dispenser to a supporting surface by screws, clamps or other more or less permanent fasteners.

The principal objects and advantages of this invention reside in the provision of a device for containing and dispensing a roll of adhesive tape which is simple and economical of construction and of such a nature as to readily allow the insertion of a roll of the adhesive tape, and the removal of the same or its core when desired, and one provided with means for severing any desired length of the material from the roll, and further provided with means for retaining the free end of the tape in a convenient position for removal of a following portion of the tape, such means being adapted for preventing the accidental displacement of the free end of the tape from its proper position for the removal of a succeeding portion of the tape; the provision of an improved dispenser for a roll of adhesive tape so constructed that replacement rolls of the tape can be easily and readily inserted; and the provision of an improved dispenser for pressure sensitive tape which will afford means for the efficient and accurate dispensing of the tape and thus avoid waste, and wherein such means are visible at all times.

This invention has as a further object the provision of a container for tapes of such a construction and provided with such means as will enable it to remain firmly in place upon the supporting surface during use and at the same time be easily removable from one place to another as desired, thus imparting to the device full portability.

Another object of the invention is the provision of a dispenser wherein the free end of the tape is maintained in a position to be readily grasped by the user for withdrawing the tape for use.

The foregoing and such further objects and advantages as may appear or be pointed out as this description proceeds are contained in the structural embodiment illustrated in the accompanying drawing in which.

Figure 1:
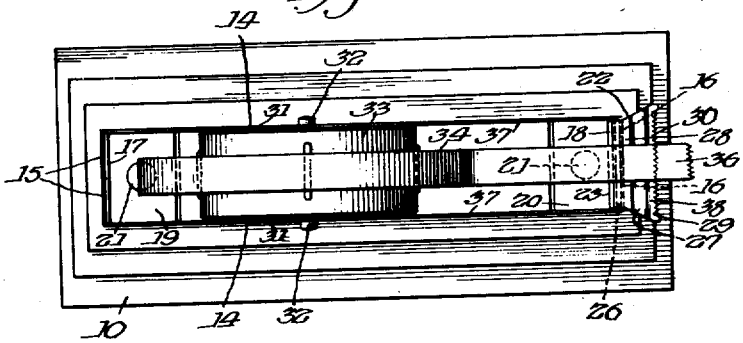
Figure 1 is a plan view looking down upon the container.

Referring now to the drawing, I provide a base portion 10, which is preferably made in a single casting of iron or other suitable metal to provide a member having considerable weight. This base member is provided with a plurality, conveniently four, rubber suction cups 11, fastened to the base 10 by threaded lug screws 12, which are screwed into complemental threaded apertures provided in the bottom of the base 10. Thus, due to the weight of the entire container assembly, particularly that of the base 10, the suction cups 11 obtain a firm grip upon any surface 13, upon which it may be supported, and effectively retain the dispenser in position during use while at the same time enabling it to be moved from place to place if desired.

Upon the base 10 I provide a roll supporting structure comprising the two side walls 14 which are bent at their ends to form the end portions 15 and 16 and which are mounted upon the base in spaced parallel relationship by means of angularly bent members 17 and 18 to which the end portions 15 and 16 of the side walls 14 are respectively secured by any convenient means such as spot welding. The members 17 and 18 have angularly bent horizontal portions 19 and 20 respectively which are fastened to the base member 10 by any convenient means such as, for instance, rivets or bolts 21, all as clearly shown in Figure 2 of the drawing. Also supported by the member 18 I provide the member 22 which comprises the tape supporting severing and releasing means employed by me and is shown in detail in Figure 4. The member 22 is removably supported on the member 18 by means of a clamping member 23 which has a hole threaded to receive a screw 24 which passes through a complemental hole in the members 18 and 16 and through the slot 25 provided in the member 22. The means for clamping the member 22 to the support is clearly shown in Figure 2. The side members 14, supporting members 17 and 18 and clamping member 23 are conveniently made out of any desired sheet metal having the required strength for the purposes of the structure. However, it is obvious that the side members 14 could be made of one or more sections of light cast material or of other suitable construction.

Figure 4:
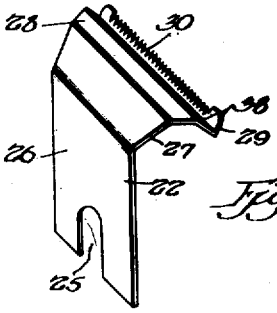
Figure 4 is a detail view of the combined severing and retaining means.

Reverting now to the combined sustaining, severing and retaining member indicated generally as 22, this comprises a piece of plate steel and includes the shank 26 provided with a slot 25 above referred to affording means for clamping this member in position on the support. The upper end of this member 22 is bent to provide a generally arched shaped portion indicated at 27 which may conveniently include a plurality of angularly related portions, as shown in Figure 4, or may have a single curved portion, but which in either case presents a supporting area indicated at 28 which serves as a means not only for supporting but for retaining the severed end of the tape as will be later described. The outer end of the member 22 beyond the arched portion is bent sharply upward to provide a severing portion generally indicated at 29 having a severing edge 30 which is conveniently serrated or formed of a plurality of sharp points or teeth as shown in Figure 4.

Reverting now to the side wall members 14, these are provided with notches 31, preferably inclined, which receive the projecting ends of the shaft 32 of a drum 33. The drum, which is adapted to receive the roll of tape to be dispensed, is generally indicated at 34. The drum 33 is conveniently made of sheet metal forming a closed cylinder of a thickness which can conveniently be accommodated between the spaced walls 14 so as to allow free rotation of the drum and shaft 32 in the notches 31. The roll of tape is wound upon a core 35, which usually fits snugly upon the drum 33.

Figure 2:
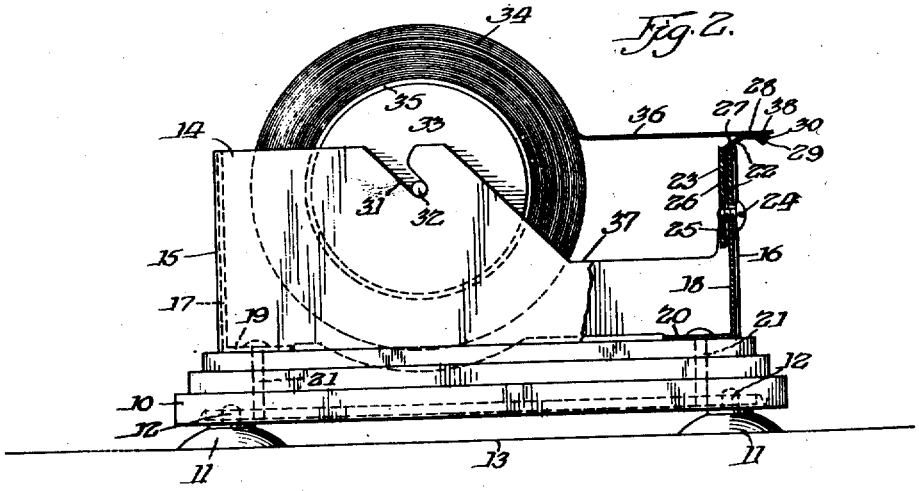
Figure 2 is a side elevation view partly in section.
Figure 3:
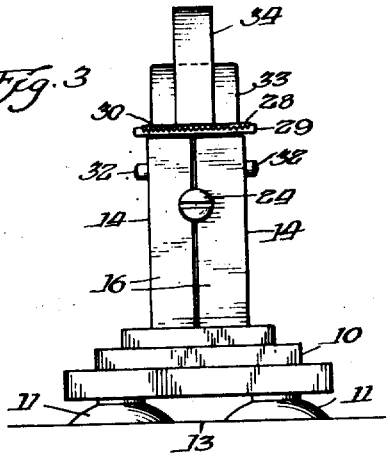
Figure 3 is an end elevation view of the dispensing end of the dispenser.

The adhesive coated tape indicated at 36, when removed from the roll 34 pulls away from the roll at a constant angle due to the adhesion between the pressure sensitive adhesive coated side of the tape and the back of the underlying layer in the roll. The spindle notches 31 are so placed relative to the position of the area 28 and cutting edge 30 of the member 22 that the tape as removed assumes a substantially horizontal position as shown in Figure 2. Furthermore the relative elevation of the area 28 and the cutting edge 30 of the member 22 is such that when the tape is removed it will pass over the area 28 without coming in contact with the cutting edge 30 and also the tape being removed from the roll has its adhesive side downward.

Referring again to the side wall members 14, these are cut away beyond the spindle notches 31 and adjacent to the end which supports the member 22 as shown at 37 to afford easy access to that portion of the tape between roll 34 and the member 22.

Thus it will be readily seen that in the operation of this dispenser the roll of tape 34 is mounted upon the drum 33, which is then placed in the dispenser and supported by the shaft 32 in the notches 31. The free end of the tape then passes from the roll over the area 28 and the cutting edge 30. The desired portion of the tape can then be removed by pulling upon the free end 36 and when the desired portion has been removed from the roll by merely bringing the tape downward it will first contact the area 28 and be held in position by the adhesive action of the pressure sensitive coating of the tape upon the area 28; a further downward movement then causes the tape to come in contact with the severing edge 30 and the dispensed portion is thus severed. Subsequent portions are successively removed by grasping the portion 36 between the area 28 and the roll, lifting the tape slightly and again removing the desired portion by pulling upon the free end of the tape. Furthermore, when a portion has been removed the free end is retained in position by the adhesive action of the coating of the tape on the support 28 and also to a certain extent by the contact of the severed end with the severing blade.

It is further apparent that this device is effective in operation and eliminates the need for elaborate dispensing apertures which make difficult the threading of the tape through such apertures.

It is also apparent that between the support or area 28 and the severing edge 30 there is a groove or trough 38 which is formed by the bending of the member 22. As the tape is dispensed and severed by edge 30 any excess of adhesive scraped or otherwise removed thereby is deposited in said groove or trough 38 and thus prevents the fouling of the severing edge 30. Further, obviously, the groove or trough facilitates the cleaning of the device, in that any residue of adhesive left on the teeth is forced down into the groove by the severing of the following piece of tape and this accumulation of adhesive is removed from the trough from time to time, thus the teeth of the cutting serrated edge are kept clean.

It is believed that the operation and using of my invention has been fully described and disclosed in the above description of my invention.

Having thus described my invention and illustrated its use what I claim as new and desire to secure by Letters Patent is:

1. In a device for dispensing adhesive tape of the pressure-sensitive type, a roller for supporting a coil of tape, a frame in which said roller is supported for rotation, a standard formed on said frame opposite to and spaced from said roller, said standard carrying a member having a smooth, hard surface to which said tape will lightly and detachably adhere by reason of its pressure-sensitive coating, a cutting edge in advance of said hard-surfaced member but closely adjacent thereto, and a trough narrowly separating said cutting edge from said member.

2. A device for dispensing adhesive tape as set forth in claim 1 in which said hard-surfaced member, cutting edge and trough are formed as a unitary sheet metal strip.

3. A device for dispensing tape coated with a pressure-sensitive adhesive comprising means for rotatably supporting a roll of said pressure-sensitive adhesive tape, a severing edge and a surface positioned between said roll supporting means and said severing edge to which said tape will lightly and detachably adhere by reason of its pressure-sensitive coating when brought into contact with said severing edge, said surface being closely adjacent to but narrowly spaced from said severing edge by an intervening valley.

4. A device for dispensing tape coated with a pressure-sensitive adhesive comprising a support for a roll of said pressure-sensitive adhesive tape which permits free rotation of said roll, an element providing a smooth hard surface and terminating in a severing edge, said smooth hard surface being closely adjacent and in fixed relation to said severing edge and located between said severing edge and said roll support, said smooth hard-surface being so positioned that said tape will adhere thereto when its pressure-sensitive adhesive coated side is brought into contact with said severing edge, the area of said smooth surface being such as to provide adherence of the tape thereto with sufficient firmness to support and retain the end of the tape and prevent accidental displacement thereof under normal conditions of usage, connecting members joining said roll support and said smooth surfaced member in fixed relation to each other, so that when tape is withdrawn from said roll and its pressure-sensitive adhesive side is brought toward the severing edge, it will first contact and adhere to the surface of said smooth surfaced member and then, upon a slight further movement, will contact said severing edge, thus severing the desired strip of tape, said smooth surface serving to anchor the tape against sidewise movement on said severing edge during the severing operation, the aforesaid connecting members intermediate the roll support and said smooth surface receding sufficiently far below a line extending from the center of the roll support to said smooth surface so as to provide an open space permitting grasping of the tape with the fingers for detachment thereof from said smooth surface for withdrawal of a portion of said tape from said roll thereof; said device serving to retain the tape in convenient position for grasping at all times, to avoid wrinkling the tape and to provide a clean-cut strip, and to prevent smudging the very ends of a dispensed strip of tape during the act of dispensing.

5. A device for dispensing tape coated with a pressure-sensitive adhesive comprising means for rotatably supporting a roll of said pressure-sensitive adhesive tape, a member fixed to said roll supporting means and comprising a smooth hard surface to which said tape will lightly and detachably adhere by reason of its pressure-sensitive coating when brought into contact therewith, said surface extending away from said roll supporting means and terminating in a severing edge, the area of said smooth surface being such as to provide adherence of the tape thereto with sufficient firmness to support and retain the end of the tape and prevent accidental displacement thereof under normal conditions of usage, said severing edge being so disposed that when the tape is moved toward it, said tape will first contact said smooth hard surface and on slight further movement will contact said severing edge, said severing edge being closely adjacent to said smooth hard surface so that the tape is retained by the latter against side-wise slippage during the severing of a strip of tape on said severing edge, there being a free space between said tape engaging surface and said roll in a manner permitting the portion of tape extending from said roll to said surface to be grasped with the fingers for detachment from said surface for withdrawal of a portion of said tape from said roll thereof.

JOHN A. BORDEN.

REFERENCES CITED

The following references are of record in the file of this patent:

UNITED STATES PATENTS

| Number | Name | Date |
|---|---|---|
| 856,136 | Elliott | June 4, 1907 |
| 1,708,725 | Huempfner | Apr. 9, 1929 |
| 1,831,746 | Little | Nov. 10, 1931 |
| 1,837,180 | Bennett | Dec. 15, 1931 |